No. 690,277. Patented Dec. 31, 1901.
F. K. HATFIELD.
GARMENT FASTENER.
(Application filed Oct. 19, 1901.)
(No Model.)
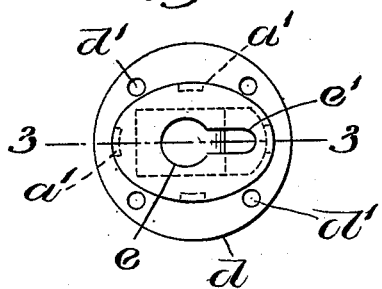
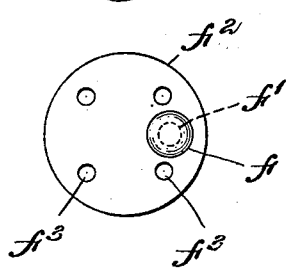
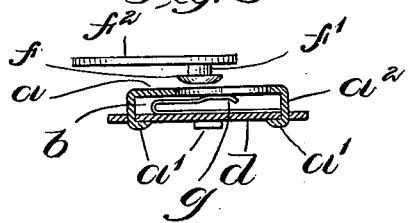
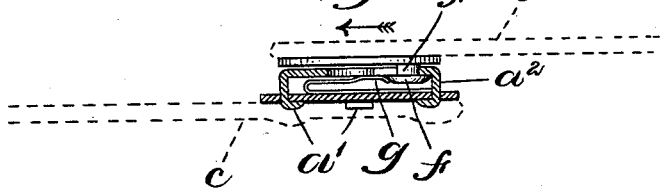
Witnesses:
E. Batchelder
Adeline C. Ratigan
Inventor:
F. K. Hatfield
by Wright Brown & Quinby
Attys.

UNITED STATES PATENT OFFICE.

FRANK K. HATFIELD, OF DORCHESTER, MASSACHUSETTS, ASSIGNOR OF ONE-HALF TO FRANCIS F. HICKS, OF BOSTON, MASSACHUSETTS.

GARMENT-FASTENER.

SPECIFICATION forming part of Letters Patent No. 690,277, dated December 31, 1901.

Application filed October 19, 1901. Serial No. 79,263. (No model.)

*To all whom it may concern:*

Be it known that I, FRANK K. HATFIELD, of Dorchester, in the county of Suffolk and State of Massachusetts, have invented certain new and useful Improvements in Garment-Fasteners, of which the following is a specification.

This invention relates to fasteners for the plackets of dress-skirts, and has for its object to provide a fastener the members of which shall be adapted to be readily and conveniently engaged with each other to secure the parts of the placket together without liability of accidental separation.

The invention consists in the improvements which I will now proceed to describe and claim.

Of the accompanying drawings, Figure 1 represents a side view of the socket member of my improved fastener. Fig. 2 represents a side view of the stud member of the fastener. Fig. 3 represents a section on line 3 3 of Fig. 1 and an edge view of the stud member, the latter being separated from the socket member. Fig. 4 represents a view similar to Fig. 3, showing the two members engaged or connected.

The same letters of reference indicate the same parts in all the figures.

The socket member of my improved fastener comprises an outer plate $a$, behind which is a chamber or recess $b$. Said plate is provided with suitable means for attachment to the inner member $c$ of the placket, the means here shown being a base-plate $d$, which is slotted to receive ears or prongs $a'$, formed on the flange $a^2$ of the plate $a$, and the orifices $d'$ to receive stitches connecting the base-plate with the placket member $c$. The flange $a^2$ is of sufficient height to form the chamber or recess $b$ between the plate $a$ and the base-plate $d$. In the plate $a$ is formed a keyhole-shaped slot having an enlarged end $e$ and a contracted end $e'$.

The stud member of the fastener comprises a stud-head $f$, a stud neck or shank $f'$, and a base-plate $f^2$, to which said shank is affixed, said plate having orifices $f^3$ to receive the stitches which attach the stud member to the outer placket member $c'$. The diameter of the head $f$ is somewhat less than the width of the enlarged portion $e$ and is greater than the width of the contracted portion $e'$, so that when the members are in the relative positions shown in Fig. 3 the head of the stud member can be inserted in the recess $b$ through the enlarged portion of the slot. The socket member can then be moved laterally to the position shown in Fig. 4, thus causing the shank $f'$ to enter the contracted portion $e'$ of the slot, the head $f$ bearing against the inner side of the plate $a$ at opposite sides of the slot, so that the two parts are interlocked in such manner as to prevent direct outward movement of the stud member, it being necessary to move the stud member in the direction indicated by the arrow in Fig. 4 before it can be withdrawn from the socket member. To prevent loose or accidental movement of the stud member in the direction last mentioned, I provide the socket member with a detent $g$, which is here shown as a resilient metal strip, a part of which bears on the base-plate $d$ and may be soldered or otherwise affixed thereto, while another part—namely, the part $g$—constitutes a spring-tongue which is so arranged that its free end will bear against the side of the head of the said member when the latter is in the position shown in Fig. 4, and thus prevent movement of the stud member in the direction indicated by the arrow unless sufficient pressure is applied to displace the detent $g$. The detent $g$ is sufficiently yielding to permit the insertion of the stud member into the recess $b$ and its movement to the position shown in Fig. 4. It will be seen, therefore, that provision is made for conveniently engaging or interlocking the members of the fastener and for preventing accidental separation of said members.

I claim—

A placket-fastener comprising a socket member consisting of a base-plate and an outer plate forming a recess or chamber between them, the outer plate having a slot enlarged at one end and contracted at the other, a stud member having a head formed to pass through the enlarged end of the slot and of greater diameter than the width of the contracted end, and a detent inclosed within the socket member and protected thereby and adapted to hold the stud at the contracted end of the slot, said detent consisting of a U-shaped spring secured at one end to the base-plate and having its outer flat portion extending under the enlarged end of the slot and to a point whereby its end is adapted to bear against the side of the head when the latter is at the contracted end of the slot.

In testimony whereof I have affixed my signature in presence of two witnesses.

FRANK K. HATFIELD.

Witnesses:
FRANCIS F. HICKS,
C. F. BROWN.